United States Patent
Jin et al.

(10) Patent No.: US 10,985,824 B2
(45) Date of Patent: Apr. 20, 2021

(54) CHANNEL STATE INFORMATION FEEDBACK AND RECEIVING METHOD, TRANSMIT-END DEVICE, AND RECEIVE-END DEVICE

(71) Applicant: Huawei Technologies Co., Ltd., Shenzhen (CN)

(72) Inventors: Huangping Jin, Shanghai (CN); Peng Jiang, Shenzhen (CN); Wei Han, Shanghai (CN); Peng Shang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/829,389

(22) Filed: Mar. 25, 2020

(65) Prior Publication Data

US 2020/0244330 A1 Jul. 30, 2020

Related U.S. Application Data

(63) Continuation of application No. PCT/CN2018/105572, filed on Sep. 13, 2018.

(30) Foreign Application Priority Data

Sep. 26, 2017 (CN) .......................... 201710896701.1

(51) Int. Cl.
*H04B 7/06* (2006.01)

(52) U.S. Cl.
CPC ......... *H04B 7/0626* (2013.01); *H04B 7/0639* (2013.01)

(58) Field of Classification Search
CPC ...... H04B 7/0626; H04B 7/0478; H04B 7/06; H04B 7/0639; H04B 7/066; H04B 7/0663; H04B 7/10
See application file for complete search history.

(56) References Cited

U.S. PATENT DOCUMENTS

2012/0207240 A1* 8/2012 Chen .................... H04B 7/0639
375/285
2012/0320862 A1* 12/2012 Ko ........................ H04L 1/0026
370/329

(Continued)

FOREIGN PATENT DOCUMENTS

CN   103746730 A   4/2014
CN   106160926 A   11/2016

OTHER PUBLICATIONS

Samsung, "Type II CSI reporting", 3GPP TSP RAN WG1 Meeting #88; R1-1702948, XP051220708, Feb. 13-17, 2017, 8 pages, Athens, Greece.

(Continued)

*Primary Examiner* — Khanh C Tran
(74) *Attorney, Agent, or Firm* — Slater Matsil, LLP (57) ABSTRACT

A channel state information feedback method includes: generating, by a transmit-end device, codebook indication information of K transport layers, where K is an integer greater than or equal to 1; and for each of at least one of the K transport layers, the codebook indication information includes narrowband superposition coefficients of N sub-bands of the layer, where a quantity of the narrowband superposition coefficients of the N sub-bands is less than R(L−1)*N, N is an integer greater than or equal to 2, R is a quantity of polarization directions and R is an integer greater than or equal to 1, and L is a quantity of pieces of beam information used by the K transport layers and L is an integer greater than or equal to 2; and sending, by the transmit-end device, the codebook indication information.

14 Claims, 3 Drawing Sheets

(56) References Cited

U.S. PATENT DOCUMENTS

| | | | |
|---|---|---|---|
| 2013/0028345 A1* | 1/2013 | Ko | H04L 25/03949 |
| | | | 375/267 |
| 2015/0230102 A1 | 8/2015 | Kang et al. | |
| 2018/0183556 A1* | 6/2018 | Shin | H04B 7/0478 |
| 2018/0212656 A1 | 7/2018 | Zhao et al. | |
| 2019/0074884 A1* | 3/2019 | Chen | H04B 7/0632 |
| 2020/0136693 A1* | 4/2020 | Jin | H04L 1/0029 |
| 2020/0235792 A1* | 7/2020 | Yang | H04B 7/0695 |

OTHER PUBLICATIONS

Ericsson, "Frequency parametrization for Type II CSI feedback", 3GPP TSG-RAN WG1 #89ah-NR, R1-1711035, XP051305332, Jun. 27-30, 2017, 8 pages, Qingdao, China.

Samsung, "Type II CSI reporting", 3GPP TSG RAN WG1 Meeting #88bis, R1-1705349, XP051250918, Apr. 3-7, 2017, 12 pages, Spokane, USA.

Ericsson, "On Codebook Subset Restriction", 3GPP TSG-RAN WG1 NR Ad Hoc #3 R1-1716362, (Sep. 21, 2017), 8 pages.

* cited by examiner

CHANNEL STATE INFORMATION FEEDBACK AND RECEIVING METHOD, TRANSMIT-END DEVICE, AND RECEIVE-END DEVICE

CROSS-REFERENCE TO RELATED APPLICATIONS

This application is a continuation of International Application No. PCT/CN2018/105572, filed on Sep. 13, 2018, which claims priority to Chinese Patent Application No. 201710896701.1, filed on Sep. 26, 2017. The disclosures of the aforementioned applications are hereby incorporated by reference in their entireties.

TECHNICAL FIELD

This application relates to the communications field, and in particular, to a channel state information feedback method, a channel state information receiving method, a transmit-end device, and a receive-end device

BACKGROUND

Massive multiple-input multiple-output (Massive MIMO) is one of 5G key technologies widely accepted in the industry. Spectral efficiency is significantly improved by using a large-scale antenna.

Accuracy of channel state information (CSI) obtained by a base station determines performance of Massive MIMO to a great extent. In a time division duplex (TDD) system or a frequency division duplex (FDD) system in which channel reciprocity cannot be well satisfied, CSI is usually quantized by using a codebook. Therefore, design of the codebook is a key problem of Massive MIMO and a problem required to be resolved in this application.

In a long term evolution (LTE) system, a beam combination technology is usually as follows: A plurality of code words are selected from a predefined codebook, and a weighted sum of the plurality of code words is used as a precoding vector. Generally, one code word corresponds to one beam direction. To be specific, a plurality of optimal code words are selected from a plurality of candidate code words and each weighting coefficient (e.g., superposition coefficients including a broadband superposition coefficient and a narrowband superposition coefficient) of each of the plurality of code words is reported as CSI information in a form of precoding matrix indicators (PMI). New radio (NR) Massive MIMO has a higher requirement on channel state information feedback, and the foregoing mechanism cannot satisfy a requirement of NR on reducing signaling overheads.

SUMMARY

To satisfy a requirement of an NR Massive MIMO system on channel state information feedback, this application provides a channel state information feedback method, a channel state information receiving method, a transmit-end device, and a receive-end device.

This application provides a channel state information feedback method, including: generating, by a transmit-end device, codebook indication information of K transport layers, where K is an integer greater than or equal to 1; and for each of at least one of the K transport layers, the codebook indication information includes narrowband superposition coefficients of N sub-bands of the layer, where a quantity of the narrowband superposition coefficients of the N sub-bands is less than $R(L-1)*N$, N is an integer greater than or equal to 2, R is a quantity of polarization directions and R is an integer greater than or equal to 1, and L is a quantity of pieces of beam information used by the K transport layers and L is an integer greater than or equal to 2; and sending, by the transmit-end device, the codebook indication information. A channel state information receiving method, including: receiving, by a receive-end device, codebook indication information of K transport layers, and determining a precoding vector of each of the K transport layers based on the codebook indication information. In the technical solution, for each of at least one of the K transport layers, the quantity of the narrowband superposition coefficients that are of the N sub-bands of the transport layer and that are carried in the codebook indication information is less than $R(L-1)*N$. In other words, compared with the current system, a quantity of superposition coefficients that are fed back is reduced, thereby helping reduce feedback overheads of channel state information.

Correspondingly, this application further provides a transmit-end device, including: a processor and a transceiver. The processor is configured to generate codebook indication information of K transport layers, where K is an integer greater than or equal to 1; and for each of at least one of the K transport layers, the codebook indication information includes narrowband superposition coefficients of N sub-bands of the layer, where a quantity of the narrowband superposition coefficients of the N sub-bands is less than $R(L-1)*N$, N is an integer greater than or equal to 2, R is a quantity of polarization directions and R is an integer greater than or equal to 1, and L is a quantity of pieces of beam information used by the K transport layers and L is an integer greater than or equal to 2. The transceiver is configured to send the codebook indication information.

According to another aspect, this application further provides a receive-end device, including: a transceiver and a processor. The transceiver is configured to receive codebook indication information of K transport layers, where K is an integer greater than or equal to 1; and for each of at least one of the K transport layers, the codebook indication information includes narrowband superposition coefficients of N sub-bands of the layer, where a quantity of the narrowband superposition coefficients of the N sub-bands is less than $R(L-1)*N$, N is an integer greater than or equal to 2, R is a quantity of polarization directions and R is an integer greater than or equal to 1, and L is a quantity of pieces of beam information used by the K transport layers and L is an integer greater than or equal to 2. The processor is configured to determine a precoding vector of each of the K transport layers based on the codebook indication information.

It should be noted that for any other transport layer of the K transport layers, the information included in the codebook indication information may be implemented with reference to the technical solution and according to the method in the current system. Correspondingly, the receive-end device can determine a precoding vector of the transport layer according to a corresponding method. For example, for any other transport layer of the K transport layers, the codebook indication information includes $R(L-1)*N$ narrowband superposition coefficients, or includes $RL*N$ narrowband superposition coefficient. For explanations of $R(L-1)*N$ and $RL*N$, refer to DESCRIPTION OF EMBODIMENTS below. Details are not described herein again. The receive-end device can determine the precoding vector of the transport layer according to formula 1 in DESCRIPTION OF EMBODIMENTS.

During specific implementation, the transmit-end device may be a network device, for example, a base station, or may be a terminal; and the receive-end device may be a terminal, or may be a network device, for example, a base station.

During specific implementation, R(L−1)*N represents a quantity of elements required to be transmitted in a matrix obtained by normalizing a matrix including narrowband superposition coefficients of N sub-bands of a transport layer. During specific implementation, specifically, the narrowband superposition coefficients are a combination of the narrowband superposition coefficients. The combination of the narrowband superposition coefficients may include only narrowband phase coefficients and may include the narrowband phase coefficients and narrowband amplitude coefficients.

During specific implementation, the N sub-bands of the transport layer may usually be all sub-bands of the transport layer.

During specific implementation, the codebook indication information may further, for example, but is not limited to include at least one of the following information: the beam information used by the K transport layers, and a broadband superposition coefficient.

During specific implementation, for any of at least one of the K transport layers (assuming that any transport layer is marked as a first transport layer), a matrix C includes the narrowband superposition coefficients of the N sub-bands of the layer, where a quantity of elements in the matrix C is RL*N. Before the generating, by a transmit-end device, codebook indication information of K transport layers, the method further includes: converting, by the transmit-end device, the matrix C, to obtain at least two submatrices; or normalizing, by the transmit-end device, the matrix C, and converting the normalized matrix to obtain at least two submatrices. In any one of the two manners, the codebook indication information includes elements in the at least two submatrices. Correspondingly, the determining, by the receive-end device, a precoding vector of each of the K transport layers based on the codebook indication information may include: restoring, by the receive-end device, the matrix C based on the elements in the at least two submatrices and an algorithm used when performing the conversion step, and determining a precoding vector of the first transport layer based on the restored matrix C. Optionally, an algorithm used when performing the conversion step includes at least one of the following: an SVD algorithm, a QR decomposition algorithm, and the like. Optionally, the normalizing, by the transmit-end device, the matrix C may include: performing, by the transmit-end device, uniform normalization on each element in the matrix C; or performing, by the transmit-end device, each element in each column of the matrix C.

During specific implementation, for any of at least one of the K transport layers (assuming that any transport layer is marked as a first transport layer), a matrix C includes the narrowband superposition coefficients of the N sub-bands of the layer, where a quantity of elements in the matrix C is N*RL; and before the generating, by a transmit-end device, codebook indication information of K transport layers, the method further includes: selecting, by the transmit-end device, T columns of elements from the matrix C, where T is less than a column quantity of the matrix C, and the codebook indication information includes the T columns of elements. Correspondingly, the determining, by the receive-end device, a precoding vector of each of the K transport layers based on the codebook indication information may include: restoring, by the receive-end device, the matrix C based on the T columns of elements and location information of the T columns of elements in the matrix C, and determining a precoding vector of the first transport layer based on the restored matrix C. Optionally, the codebook indication information may further include the location information of the T columns of elements in the matrix C. In addition, the location information may be pre-agreed on by the transmit and receive ends.

During specific implementation, for any of at least one of the K transport layers (assuming that any transport layer is marked as a first transport layer), a matrix C includes the narrowband superposition coefficients of the N sub-bands of the layer, where a quantity of elements in the matrix C is N*RL; and before the generating, by a transmit-end device, codebook indication information of K transport layers, the method further includes: selecting, by the transmit-end device, T columns of elements from the matrix C, and normalizing the T columns of elements, where T is less than a column quantity of the matrix C, and the codebook indication information includes the T columns of normalized elements. Correspondingly, the determining, by the receive-end device, a precoding vector of each of the K transport layers based on the codebook indication information may include: restoring, by the receive-end device, the matrix C based on the T columns of normalized elements and location information of the T columns of normalized elements in the matrix C, and determining a precoding vector of the first transport layer based on the restored matrix C. Optionally, the normalizing, by the transmit-end device, the T columns of elements may include: performing, by the transmit-end device, uniform normalization on each element in each column of T columns of elements. Optionally, the codebook indication information may further include the location information of the T columns of elements in the matrix C. In addition, the location information may be pre-agreed on by the transmit and receive ends.

It may be understood that the technical solution in which normalization is performed can enable the converted matrix and the T columns of elements or the T columns of normalized elements to be quantized within a limited range. In this way, the difference between the matrix C restored by the receive-end device and the matrix C before the conversion step is performed by the transmit-end device is reduced, thereby improving accuracy of the finally obtained precoding vector.

According to another aspect, an embodiment of this application provides a base station. The base station has a function of implementing behavior of the base station in the foregoing method designs. The function may be implemented by hardware or may be implemented by hardware executing corresponding software. The hardware or the software includes one or more modules corresponding to the foregoing functions.

In a possible design, a structure of the base station includes a processor and a transceiver, where the processor is configured to support the base station in performing corresponding functions in the foregoing method. The transceiver is configured to: support communication between the base station and a terminal, send to the terminal, information or signaling in the foregoing method, and receive information or an instruction that is sent by the base station. The base station may further include a memory. The memory is configured to: couple to the processor, and store necessary program instructions and data of the base station.

According to still another aspect, an embodiment of this application provides a terminal. The terminal has a function of implementing behavior of the terminal in the foregoing method designs. The functions may be implemented by hardware, and a structure of the terminal includes a transceiver and a processor. The functions may alternatively be implemented by hardware executing corresponding software. The hardware or the software includes one or more modules corresponding to the foregoing functions. The modules may be software and/or hardware.

According to still another aspect, an embodiment of this application provides a control node. The control node may include a controller/processor, a memory, and a communications unit. The controller/processor may be configured to coordinate resource management and configuration between a plurality of base stations, and may be configured to perform the channel state information feedback method described in the foregoing embodiment. The memory may be configured to store program code and data of the control node. The communications unit is configured to support communication between the control node and a base station, for example, send information about a configured resource to the base station.

According to still another aspect, the transmit-end device and the receive-end device may be a chip including a processor and an interface. When implemented by hardware, the processor may be a logical circuit, an integrated circuit and the like. When implemented by software, the processor may be a general-purpose processor that is implemented by reading software code stored in a memory, and the memory may be integrated in the processor, or may be located outside the processor, and may exist independently.

According to still another aspect, an embodiment of this application provides a processor. The processor may include: at least one circuit, configured to generate codebook indication information of K transport layers, where K is an integer greater than or equal to 1; and for each of at least one of the K transport layers, the codebook indication information includes narrowband superposition coefficients of N sub-bands of the layer, where a quantity of the narrowband superposition coefficients of the N sub-bands is less than $R(L-1)*N$, N is an integer greater than or equal to 2, R is a quantity of polarization directions and R is an integer greater than or equal to 1, and L is a quantity of pieces of beam information used by the K transport layers and L is an integer greater than or equal to 2; and at least one circuit, configured to send the codebook indication information by using a transmitter.

In a possible design, for any of at least one of the K transport layers, a matrix C includes the narrowband superposition coefficients of the N sub-bands of the layer, where a quantity of elements in the matrix C is $RL*N$. The processor may further include at least one circuit, configured to convert the matrix C, to obtain at least two submatrices; or normalize the matrix C and convert the normalized matrix to obtain at least two submatrices.

In a possible design, for any of at least one of the K transport layers, a matrix C includes the narrowband superposition coefficients of the N sub-bands of the layer, where a quantity of elements in the matrix C is $N*RL$. The processor may further include: at least one circuit, configured to select T columns of elements from the matrix C, where T is less than a column quantity of the matrix C, and the codebook indication information includes the T columns of elements. Alternatively, the at least one circuit is configured to select T columns of elements from the matrix C, and normalize the T columns of elements, where T is less than a column quantity of the matrix C, and the codebook indication information includes the T columns of normalized elements.

According to still another aspect, an embodiment of this application provides a processor. The processor may include: at least one circuit, configured to receive codebook indication information of K transport layers by using a receiver, where K is an integer greater than or equal to 1; and for each of at least one of the K transport layers, the codebook indication information includes narrowband superposition coefficients of N sub-bands of the layer, where a quantity of the narrowband superposition coefficients of the N sub-bands is less than $R(L-1)*N$, N is an integer greater than or equal to 2, R is a quantity of polarization directions and R is an integer greater than or equal to 1, and L is a quantity of pieces of beam information used by the K transport layers and L is an integer greater than or equal to 2; and at least one circuit, configured to determine a precoding vector of each of the K transport layers based on the codebook indication information.

In a possible design, the at least one transport layer includes a first transport layer, and a matrix C includes narrowband superposition coefficients of N sub-bands of the first transport layer, where a quantity of elements in the matrix C is $RL*N$; and the codebook indication information includes elements in at least two submatrices obtained through conversion of the matrix C. The at least one circuit that is configured to determine a precoding vector of each of the K transport layers is specifically configured to restore the matrix C based on the elements in the at least two submatrices and an algorithm used when performing the conversion step, and determine a precoding vector of the first transport layer based on the restored matrix C.

In a possible design, the at least one transport layer includes a first transport layer, and a matrix C includes narrowband superposition coefficients of N sub-bands of the first transport layer, where a quantity of elements in the matrix C is $RL*N$; and the codebook indication information includes T columns of elements in the matrix C, where T is less than a column quantity of the matrix C. The at least one circuit that is configured to determine a precoding vector of each of the K transport layers is specifically configured to restore the matrix C based on the T columns of elements and location information of the T columns of elements in the matrix C, and determine a precoding vector of the first transport layer based on the restored matrix C.

According to still another aspect, an embodiment of the present invention provides a communications system. The system includes the base station and the terminal that are described in the foregoing aspects. Optionally, the communications system may further include the control node in the foregoing embodiments.

According to yet another aspect, an embodiment of this application provides a computer storage medium, configured to store computer software instructions used by the foregoing base station. The computer storage medium includes a program designed for executing the foregoing aspects.

According to yet another aspect, an embodiment of this application provides a computer storage medium, configured to store computer software instructions used by the foregoing terminal. The computer storage medium includes a program designed for executing the foregoing aspects.

A beneficial effect of the technical solution provided in this application is that for each of at least one of the K transport layers, the quantity of narrowband superposition coefficients that are of the N sub-bands of the transport layer and that are carried in the codebook indication information is less than R(L−1)*N. In other words, compared with the current system, a quantity of superposition coefficients that are fed back is reduced, thereby helping reduce feedback overheads of channel state information.

DETAILED DESCRIPTION OF ILLUSTRATIVE EMBODIMENTS

The following describes technical solutions provided in the embodiments of this application in detail with reference to corresponding accompanying drawings.

Figure 1:
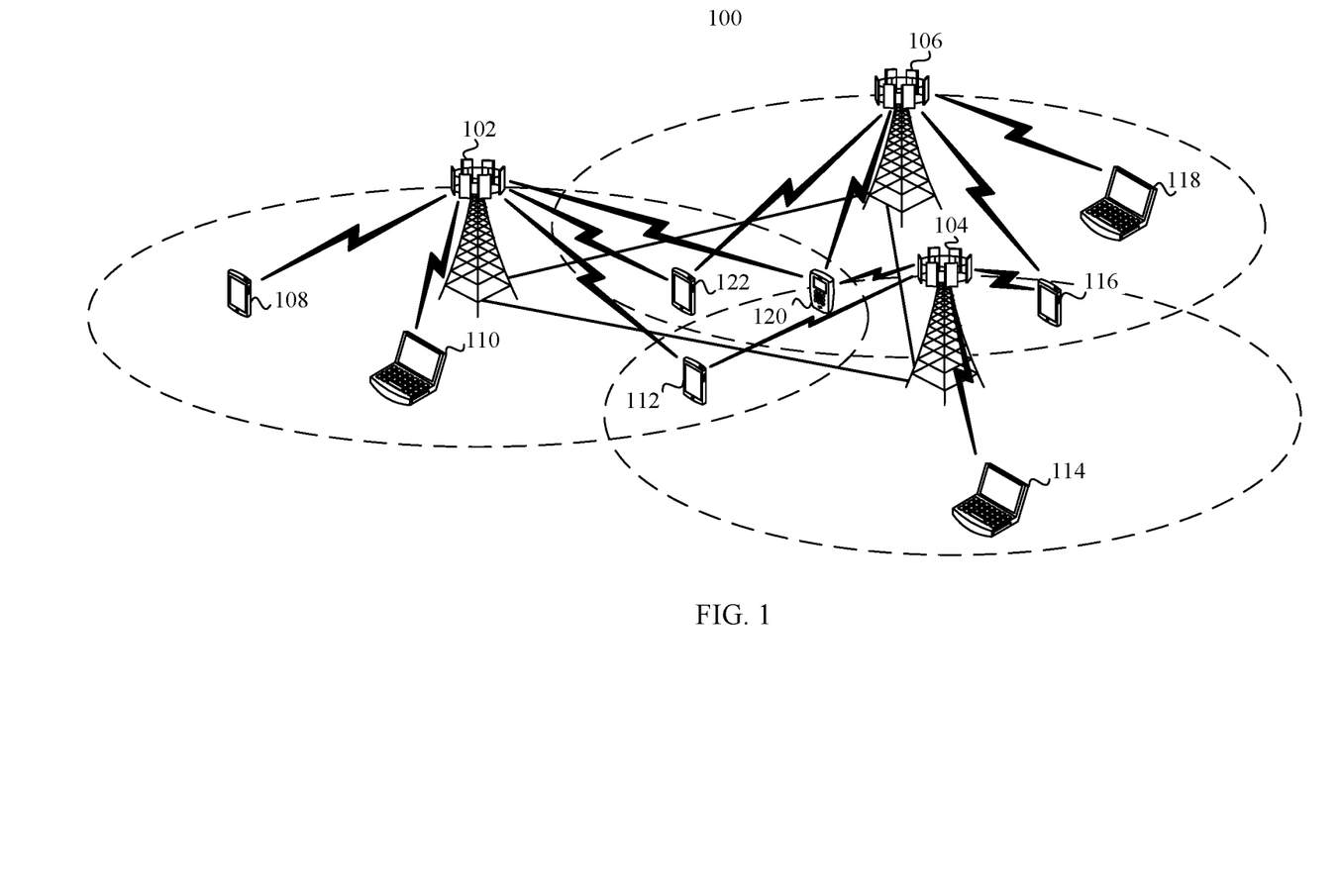
FIG. 1 is a schematic diagram of a wireless communications network to which a technical solution according to this application is applicable.

FIG. 1 is a schematic diagram of a wireless communications network 100 to which a technical solution according to this application is applicable. As shown in FIG. 1, the wireless communications network 100 includes base stations 102 to 106 and terminal devices 108 to 122. The base stations 102 to 106 may communicate with each other by using backhaul (backhaul) links (shown as straight lines between the base stations 102 to 106), where the backhaul links may be wired backhaul links (for example, optical fibers or copper cables), or may be wireless backhaul links (for example, microwaves). The terminal devices 108 to 122 may communicate with corresponding base stations 102 to 106 by using radio links (shown as polygonal lines between the base stations 102 to 106 and the terminal devices 108 to 122).

The base stations 102 to 106 are configured to provide wireless access services to the terminal devices 108 to 122. Specifically, each base station corresponds to one service coverage area (which may be referred to as a cellular, shown in each oval area in FIG. 1), and a terminal device entering the area may communicate with the base stations by using radio signals, to receive the wireless access services provided by the base stations. Service coverage areas of the base stations may overlap, and a terminal device in an overlapped area may receive radio signals from a plurality of base stations. Therefore, the terminal device may be served by the plurality of base stations simultaneously. For example, the plurality of base stations may provide the services for the terminal device in the overlapped area by using a coordinated multipoint (CoMP) technology. For example, as shown in FIG. 1, service coverage areas of the base station 102 and the base station 104 overlap, and a terminal device 112 is located in the overlapped area. Therefore, the terminal device 112 may receive radio signals from the base station 102 and the base station 104, and the base station 102 and the base station 104 may provide a service for the terminal device 112 simultaneously. For another example, as shown in FIG. 1, service coverage areas of the base station 102, the base station 104, and the base station 106 have a common overlapped area, and a terminal device 120 is located in the overlapped area. Therefore, the terminal device 120 may receive radio signals from the base station 102, the base station 104, and the base station 106, and the base station 102, the base station 104, and the base station 106 may provide a service for the terminal device 120 simultaneously.

Depending on a used wireless communications technology, a base station may also be referred to as a NodeB (NodeB), an evolved Node B (eNodeB), an access point (AP) and the like. In addition, based on a size of a provided service coverage area, base stations may be classified into a macro base station configured to provide a macro cell a micro base station configured to provide a pico cell, and a femto base station configured to provide a femto cell. With continuous evolution of the wireless communications technology, a future base station may also use another name.

The terminal devices 108 to 118 are devices having a wireless transmission and receiving function and may be deployed on land, including an indoor or outdoor device, a handheld device, a wearable device, or a vehicle-mounted device, may be deployed on a water surface (for example, in a ship), or may be deployed in air (for example, on an airplane, in a balloon, or on a satellite). The terminal device may be a mobile phone, a tablet computer (Pad), a computer having a wireless transmission and receiving function, a virtual reality (VR) terminal device, an augmented (AR) terminal device, a wireless terminal in industrial control, a wireless terminal in unmanned-driving (e.g., self driving), a wireless terminal in telemedicine (e.g., remote medical), a wireless terminal in a smart grid, a wireless terminal in transportation safety, a wireless terminal in a smart city, a wireless terminal in a smart home, and the like. This embodiment of this application imposes no limitation on an application scenario. The terminal device sometimes may also be referred to as user equipment (UE), an access terminal device, a UE unit, a UE station, a mobile station, a mobile console, a remote station, a remote terminal device, a mobile device, a UE terminal device, a terminal device, a wireless communications device, a UE agent, a UE apparatus, or the like.

The base stations 102 to 106 and the terminal devices 108 to 122 may be configured with a plurality of antennas, to support a multiple-input multiple-output (MIMO) technology. Further, the terminal devices 108 to 122 may support a single-user MIMO (SU-MIMO) technology, and support a multi-user MIMO (MU-MIMO) technology. The MU-MIMO technology may be implemented based on a space division multiple access (SDMA) technology. Because the base stations 102 to 106 and the terminal devices 108 to 122 are configured with a plurality of antennas, the base stations 102 to 106 and the terminal devices 108 to 122 may further flexibly support a single-input single-output (SISO) technology, a single-input multiple-output (SIMO), and a multiple-input single-output (MISO) technology, to implement various diversity (for example, but not limited to, transmit diversity and receive diversity) technologies and multiplexing technologies. The diversity technologies may include, for example, but is not limited to, a transmit diversity (TD) technology and a receive diversity (RD) technology, and the multiplexing technology may be a spatial multiplexing technology. Moreover, the foregoing technologies may further include various implementation solutions. For example, currently commonly used transmit diversity technologies may include, for example, but are not limited to, diversity manners such as space-time transmit diversity (STTD), space-frequency transmit diversity (SFTD), time switched transmit diversity (TSTD), frequency switched transmit diversity (FSTD), orthogonal transmit diversity (OTD), cyclic delay diversity (CDD), and a diversity manner obtained through derivation, evolution, and combination of the foregoing diversity manners. For example, in a current LTE standard, transmit diversity manners such as space-time block coding (STBC), space-frequency block coding (SFBC) and CDD are used.

Moreover, the base station 102 and the terminal devices 104 to 110 may perform communication by using various wireless communications technologies, for example, but not limited to, a time division multiple access (TDMA) technology, a frequency division multiple access (FDMA) technology, code division multiple access (CDMA) technology, a time division-synchronous code division multiple access (TD-SCDMA) technology, an orthogonal frequency division multiple access (OFDMA) technology, a single carrier frequency division multiple access (SC-FDMA) technology, a space division multiple access (SDMA) technology, and evolved and derived technologies of the technologies. The foregoing wireless communications technologies are used in various wireless communication standards as a radio access technology (RAT), to construct various wireless communications systems (or networks) currently well-known to people. The wireless communications systems include but are not limited to a global system for mobile communications (GSM), CDMA2000, wideband CDMA (wideband CDMA, WCDMA), Wi-Fi defined by the 802.11 serial standards, worldwide interoperability for microwave access (WiMAX), long term evolution (LTE), LTE-advanced (LTE-A), evolved systems of the wireless communications systems, and the like. The wireless communications network shown in FIG. 1 may be any system or network in the foregoing wireless communications systems. Unless particularly stated, the technical solutions provided in the embodiments of this application may be applied to the various wireless communications technologies and wireless communications systems described above. In addition, the terms "system" and "network" can be interchanged with each other.

It should be noted that, the wireless communications network 100 shown in FIG. 1 are merely used as an example, and are not used to limit the technical solutions of this application. A person skilled in the art should understand that, in a specific implement process, the wireless communications network 100 may further include another device, and quantities of the base stations and the terminal devices may be configured according to specific requirements.

For example, in the wireless communications network 100, if a network device, for example, a base station, needs to obtain channel state information, a terminal is required to report accurate CSI, usually reports the channel state information to the base station in a form of a precoding codebook.

Before implementations of this application are described in detail, the precoding codebook is first described as follows. In addition, the related art of this application is described in Chinese Application No. 201710284175.3, entitled "PRECODING VECTOR INDICATING AND DETERMINING METHOD AND DEVICE", which can serve as reference in its entirety.

Based on high accuracy CSI feedback of a beam combination mechanism, the precoding codebook may be represented as a two-level codebook structure:

$$W = W_1 \times W_2$$

$W_1$ is information of a long-duration broadband, and $W_2$ is information of a short-duration narrowband. $W_1$ includes a beam index and a broadband superposition coefficient which are required to be fed back, and $W_2$ includes a narrowband superposition coefficient. The broadband superposition coefficient corresponds to broadband amplitude quantization, and the narrowband superposition coefficient corresponds to narrowband amplitude and narrowband phase quantization. The broadband superposition coefficient may include a broadband amplitude coefficient, and the narrowband superposition coefficient may include a narrowband amplitude coefficient and a narrowband phase coefficient.

Generally, for precoding codebooks of the K transport layers (rank-K), a codebook of one of the K transport layers may be represented as:

$$W = W_1 W_2 = \begin{bmatrix} \alpha_0^{WB} b_0, \alpha_1^{WB} b_1, & 0 \\ L, \alpha_{L-1}^{WB} b_{L-1} & \\ & \alpha_L^{WB} b_0, \alpha_{L+1}^{WB} b_1, \\ 0 & L, \alpha_{2L-1}^{WB} b_{L-1} \end{bmatrix} \begin{bmatrix} \theta_0^{SB} \\ \theta_1^{SB} \\ M \\ \theta_{2L-1}^{SB} \end{bmatrix} \quad \text{Formula 1}$$

$$\begin{bmatrix} \theta_0^{SB} \\ \theta_1^{SB} \\ M \\ \theta_{2L-1}^{SB} \end{bmatrix}$$

is obtained by combining $$\begin{bmatrix} p_0^{SB} \\ p_1^{SB} \\ M \\ p_{2L-1}^{SB} \end{bmatrix} \text{ and } \begin{bmatrix} c_0^{SB} \\ c_1^{SB} \\ M \\ c_{2L-1}^{SB} \end{bmatrix}.$$

Where $b_i$ is a beam used to represent CSI selection when a beam combination method is used. $\alpha_i^{WB}$ is the broadband amplitude coefficient, representing quantization of a broadband amplitude. $\theta_i^{SB}$ is the narrowband superposition coefficient, representing quantization of the narrowband superposition coefficient. The narrowband superposition coefficient includes the narrowband phase coefficient. Optionally, the narrowband superposition coefficient may further include the narrowband amplitude coefficient. The formula 1 is described by using an example in which the narrowband superposition coefficient includes the narrowband amplitude coefficient and the narrowband phase coefficient. $P_i^{SB}$ is the narrowband amplitude coefficient, representing quantization of a narrowband amplitude. $c_i^{SB}$ is the narrowband phase coefficient, representing quantization of a narrowband phase, where $0 \leq i < L$, and L is a quantity of pieces of beam information used by the transport layer.

It should be noted that, the precoding codebook can be considered as an ideal precoding vector in Application No. 201710284175.3, entitled "PRECODING VECTOR INDICATING AND DETERMINING METHOD AND DEVICE". In addition, the formula 1 is described by using an example in which a quantity of polarization directions is 2.

The solution describes a precoding codebook corresponding to one transport layer (rank 1). For precoding codebooks of K transport layers (rank-K), the $W_2$ codebook matrix is K columns, and corresponding $W_2$ feedback overheads will be K times of rank 1, increasing feedback overheads.

Figure 2:
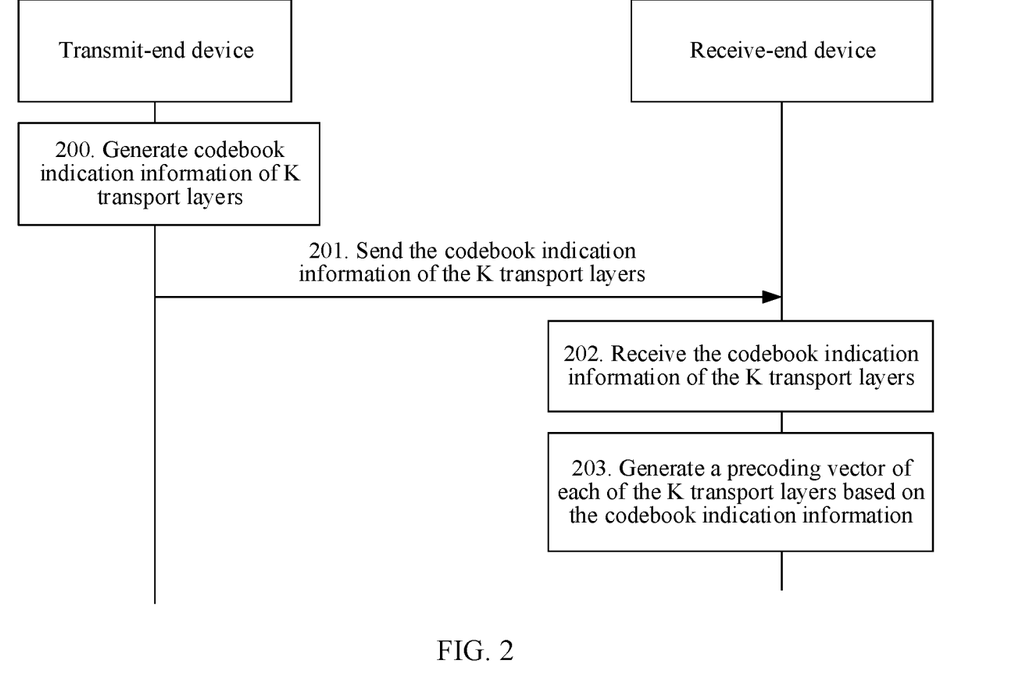
FIG. 2 is a schematic flowchart of a channel state information feedback method and a channel state information receiving method according to this application.

This application provides a channel state information feedback method and a channel state information receiving method that can implement low overheads. Specifically, in the wireless communications network 100, the transmit-end device in this application may be the terminal device in the wireless communications network 100. In this case, the receive-end device may be the base station in the wireless communications network 100. In addition, the transmit-end device in this application may be the base station in the wireless communications network 100. In this case, the receive-end device may be the terminal device in the wireless communications network 100. The channel state information feedback method and the channel state information receiving method provided in this application are shown in FIG. 2, and include the following step 200 to step 203.

Step 200. A transmit-end device generates codebook indication information of K transport layers, where K is an integer greater than or equal to 1; and for each of at least one of the K transport layers, the codebook indication information of the K transport layers includes narrowband superposition coefficients of N sub-bands of the layer, where a quantity of the narrowband superposition coefficients of the N sub-bands is less than R(L−1)*N, N is an integer greater than or equal to 2, R is a quantity of polarization directions and R is an integer greater than or equal to 1, and L is a quantity of pieces of beam information used by the K transport layers and L is an integer greater than or equal to 2.

The L pieces of beam information used by the K transport layers may be used to indicate a group of beams $b_0$ to $b_{L-1}$. The beam information is information used to indicate a beam, for example, but is not limited to an index of the beam. In this application, one beam corresponds to one piece of beam information. The L pieces of beam information used by the K transport layers are L pieces of beam information used by the receive-end device to construct the K transport layers. In some examples, for each transport layer, the receive-end device uses all of the L pieces of beam information to construct a precoding vector of the transport layer.

R(L−1)*N represents a quantity of elements required to be transmitted in a matrix obtained by normalizing a matrix including narrowband superposition coefficients of N sub-bands of one transport layer. To explicitly describe the meaning of N*R(L−1), first refer to the formula 1. In the formula 1, $$\begin{bmatrix} \theta_0^{SB} \\ \theta_1^{SB} \\ M \\ \theta_{2L-1}^{SB} \end{bmatrix}$$

specifically represents a vector including narrowband superposition coefficients of one sub-band of one transport layer, where the vector is a 2L*1 vector. Further, a matrix C includes the narrowband superposition coefficients of sub-bands of one transport layer, where the matrix C is a 2L*N matrix. It may be understood that if the quantity of the polarization directions is R, and R is an integer greater than or equal to 2, the matrix C is an RL*N matrix. In an optional implementation, the matrix C may be normalized. Moreover, the narrowband superposition coefficients used as a normalization reference are always not required to be transmitted. It may be understood that after the RL*N matrix is normalized, usually, R(L−1)*N elements other than the narrowband superposition coefficients used as the normalization reference are required to be transmitted. For a specific implementation of normalizing the matrix C, this is not limited in this application.

It should be noted that in this application, the narrowband superposition coefficients described in step 200 and the explanations of R(L−1)*N are specifically a combination of narrowband superposition coefficients. Specifically, if the narrowband superposition coefficients only include the narrowband phase coefficients, each element in the matrix C represents a narrowband phase coefficient. If the narrowband superposition coefficients include the narrowband amplitude coefficients and the narrowband phase coefficients, each element in the matrix C represents a product of one narrowband amplitude coefficient and a narrowband phase coefficient corresponding to the narrowband amplitude coefficient.

It should be noted that the N sub-bands of one transport layer may usually be all sub-bands of one transport layer. Moreover, for each of some or all of the K transport layers, for the narrowband superposition coefficients of the transport layer that are carried in the codebook indication information, refer to step 200.

It should be noted that, during actual implementation, the codebook indication information of the K transport layers may further, for example, but is not limited to include at least one of the following information: the beam information used by the K transport layers, a broadband superposition coefficient, and the like.

It should be noted that for any other transport layer of the K transport layers, the information included in the codebook indication information may be implemented with reference to the technical solution and according to the method in the current system. For example, for any other transport layer of the K transport layers, the codebook indication information includes R(L−1)*N narrowband superposition coefficients, or includes RL*N narrowband superposition coefficient. For explanations of R(L−1)*N and RL*N, refer to the foregoing description.

Step 201. The transmit-end device sends the codebook indication information of the K transport layers.

The codebook indication information of the K transport layers may be PMI, or may be other information. The codebook indication information of the K transport layers may be carried in one or more messages to be transmitted. In addition, transmission periods of different information in the codebook indication information of the K transport layers may be the same and may be different. For example, in comparison, the beam information used by the K transport layers and the broadband superposition coefficients may be transmitted in a long period, and the narrowband superposition coefficients may be transmitted in a short period.

Step 202. A receive-end device receives the codebook indication information of the K transport layers.

Step 203. The receive-end device generates the precoding vector of each of the K transport layers based on the codebook indication information of the K transport layers.

For the obtaining manner of the precoding vector of any transport layer in the at least one transport layer in step 200, refer to the following descriptions. Details are not described herein again. For precoding vectors of other transport layers in the K transport layers other than the at least one transport layer, implementation can be made according to the method in the current system. For example, for any other transport layer of the K transport layers, the codebook indication information includes R(L−1)*N narrowband superposition coefficients, or includes RL*N narrowband superposition coefficient, and the receive-end device can obtain the precoding vector of the transport layer according to the formula 1.

In the technical solution provided in this application, for each of at least one of the K transport layers, the quantity of narrowband superposition coefficients that are of the N sub-bands of the transport layer and that are carried in the codebook indication information is less than $R(L-1)*N$. In other words, compared with the current system, a quantity of superposition coefficients that are fed back is reduced, thereby helping reduce feedback overheads of channel state information.

How to implement that the quantity of narrowband superposition coefficients that are of N sub-bands of one transport layer and that are carried in codebook indication information is less than $R(L-1)*N$ is not limited in this application. Some possible implementations are provided below.

In the following implementations, assuming that for any of at least one of the K transport layers (for convenience of description, any transport layer is marked as a first transport layer hereinafter), the matrix C includes the narrowband superposition coefficients of the N sub-bands of the layer, where a quantity of elements in the matrix C is $RL*N$. For the quantity of the elements in the matrix C and the construction manner of the matrix C, refer to the foregoing descriptions.

Manner 1: The transmit-end device converts the matrix C, to obtain at least two submatrices. In this case, for the first transport layer, the codebook indication information of the K transport layers includes some or all elements in the at least two submatrices.

Manner 2: The transmit-end device normalizes the matrix C, and converts the normalized matrix to obtain at least two submatrices. In this case, for the first transport layer, the codebook indication information of the K transport layers includes some or all elements in the at least two submatrices.

Based on Manner 1 and Manner 2, step 203 may include: restoring the matrix C based on the elements in the at least two submatrices and an algorithm used when performing the conversion step, and determining a precoding vector of the first transport layer based on the restored matrix C.

It should be noted that, that the algorithm used when the transmit-end device performs the conversion step is different and/or that the information transmitted in the codebook indication information of the K transport layers is different may cause a difference between the matrix C restored by the receive-end device and the matrix C before the conversion step is performed by the transmit-end device. It may be understood that, the receive-end device does not know whether there is a difference between the restored matrix C and the matrix C before the conversion step is performed by the transmit-end device.

The algorithm used when the transmit-end device performs the conversion step may be, for example, but is not limited to at least one of the following: a singular value decomposition (singular value decomposition, SVD) algorithm and an orthogonal triangle (QR) decomposition algorithm.

That the algorithm used by the transmit-end device when performing the conversion step is the SVD algorithm is used as an example. A matrix obtained through SVD of the matrix C may be represented as follows: $C=USVH$, where U and VH are unitary matrices, and S is a diagonal matrix. U is an $RL*RL$ matrix, and VH is an $N*N$ matrix. S is an $RL*N$ matrix. Values on a diagonal of the matrix S represent eigenvalues of the matrix C. VH is a conjugate transposed matrix of the matrix V. In this example, for the first transport layer, the codebook indication information of the K transport layers may include: t eigenvalues on the diagonal of the matrix S, t columns in the matrix U, and t rows in the matrix VH (that is, t columns in the matrix V), where, t is a value less than or equal to a rank of the matrix C. Generally, the t columns in the matrix U may be, for example, but is not limited to first t columns in the matrix U; and the t columns in the matrix V may be, for example, but is not limited to the t columns in the matrix V.

It may be understood that if t is equal to the rank of the matrix C, the receive-end device can losslessly restore the matrix C. In other words, the matrix C restored by the receive-end device is the same as the matrix C before the transmit-end device performs the conversion step. In addition, it may be understood that whether the matrix C is normalized may affect values of elements on the diagonal of the matrix S.

For Manner 1, a quantization range of the elements (e.g., the eigenvalues of the matrix C) that are in the matrix S and that are carried in the codebook indication information of the K transport layers is 0 to Tmax, where Tmax is usually an empirical value. For Manner 2, a quantization range of the elements (e.g., the eigenvalues of the matrix C) that are in the matrix S and that are carried in the codebook indication information of the K transport layers is 0 to 1. In Manner 2, through normalization, the elements in the matrix S may be quantified within a limited range. In this way, the difference between the matrix C restored by the receive-end device and the matrix C before the conversion step is performed by the transmit-end device is reduced, thereby improving accuracy of the finally obtained precoding vector. That the transmit-end device normalizes the matrix C can be implemented by using one of the following two manners: (i). The transmit-end device performs uniform normalization on each element in the matrix C, specifically, normalizes other elements in the matrix C by using an element with the maximum value in the matrix C as the normalization reference. (2). The transmit-end device performs uniform normalization on each element in each column of the matrix C. Specifically, for each column of elements in the matrix C, the transmit-end device normalizes other elements in the column of elements by using an element with a largest value in the column of elements as the normalization reference.

Manner 3: The transmit-end device selects T columns of elements from the matrix C. T is less than a column quantity of the matrix C. In this case, for the first transport layer, the codebook indication information of the K transport layers includes the T columns of elements.

Manner 4: The transmit-end device selects T columns of elements from the matrix C and normalizes the T columns of elements. T is less than a column quantity of the matrix C. In this case, for the first transport layer, the codebook indication information of the K transport layers includes the T columns of normalized elements.

Based on Manner 3 and Manner 4, step 203 may include: restoring the matrix C based on the T columns of elements and location information of the T columns of elements in the matrix C, and determining a precoding vector of the first transport layer based on the restored matrix C. It should be noted that, for Manner 4, the T columns of elements in step 203 are specifically the T columns of normalized elements. Because the receive-end device does not know and does not need to know whether the T columns of elements are the normalized elements, from the perspective of the receive-end device, it is considered that the T columns of elements are the T columns of elements in the matrix C.

It may be understood that because the correlation between different sub-bands of the same transport layer, each column of elements in the matrix C represent a vector including narrowband superposition coefficients of one sub-band of the transport layer. Therefore, the receive-end device can restore the matrix C in a manner such as interpolation (for example, linear interpolation) based on estimated correlation between the T sub-bands corresponding to the T columns of elements and the other C-T sub-bands.

A rule (which is referred to as a selection rule hereinafter) used when the transmit-end device selects the T columns of elements from the matrix C or the matrix obtained through normalization of the matrix C is not limited in this application. Moreover, the selection rule may, for example, but is not limited to be statically configured, for example, configured by the transmit-end device and the receive-end device according to a protocol; or semi-statically configured, for example, configured by using radio resource control (RRC) signaling or medium access control (MAC) signaling; or dynamically configured, for example, configured by using downlink control information (DCI). It may be understood that regardless of whether the selection rule is statically, semi-statically or dynamically configured, an objective is to enable the receive-end device to know the location information of the T columns of elements in the matrix C. In other words, it may be understood that: the location information of the T columns of elements in the matrix C may be preset, or may be configured through signaling.

The selection rule may be, for example, but is not limited to one of the following: a rule for selecting an odd-numbered column from the matrix C, a rule for selecting an even-numbered column from the matrix C, a rule for selecting a column every few columns starting from a column in the matrix C, a rule for selecting first T columns from the matrix C, a rule for selecting last T columns from the matrix C, a rule for consecutively selecting T columns starting from a column of the matrix C and the like.

Information included in the location information of the T columns of elements in the matrix C is not specifically limited in this application. For example, the information may be a selection rule, or may be column numbers of the T columns of selected elements.

For Manner 3, a quantization range of the T columns of elements carried in the codebook indication information of the K transport layers is 0 to Tmax, where Tmax is usually an empirical value. For Manner 4, a quantization range of the T columns of elements carried in the codebook indication information of the K transport layers is 0 to 1. In Manner 4, through normalization, the T columns of elements may be quantified within a limited range. In this way, the difference between the matrix C restored by the receive-end device and the matrix C before the conversion step is performed by the transmit-end device is reduced, thereby improving accuracy of the finally obtained precoding vector. That the transmit-end device normalizes the T columns of elements can be implemented in the following manners: The transmit-end device performs uniform normalization on each element in each column of the T columns of selected elements. Specifically, for each column of elements of the T columns of elements, the transmit-end device normalizes other elements in the column of elements by using an element with a largest value in the column of elements as the normalization reference.

With reference to FIG. 1 and FIG. 2, the channel state information feedback method and the channel state information receiving method provided in the embodiments of this application are described from the perspective of method implementation. It should be understood that the steps or operations shown in the methods of various embodiments above are merely examples, or other operations or variations of various operations may be performed. Moreover, during specific implementation, various steps may also be performed in a sequence different from that described in the embodiments of this application, and it is possible that all operations or steps shown in the embodiments of this application are not performed. Alternatively, more operations or steps that shown in the embodiments of this application may be performed. It should be further understood that sequence numbers of the foregoing processes do not mean execution sequences in various embodiments of this application. The execution sequences of the processes should be determined according to functions and internal logic of the processes, and should not be construed as any limitation to implementation processes of the embodiments of this application.

During specific implementation, the transmit-end device may be a network device, for example, a base station, or may be a terminal. The receive-end device may be a terminal, or may be a network device, for example, a base station.

A transmit-end device and a receive-end device provided in the embodiments of this application are described below. During specific implementation, the transmit-end device in this application may be a terminal and the receive-end device may be a network device.

Figure 3:
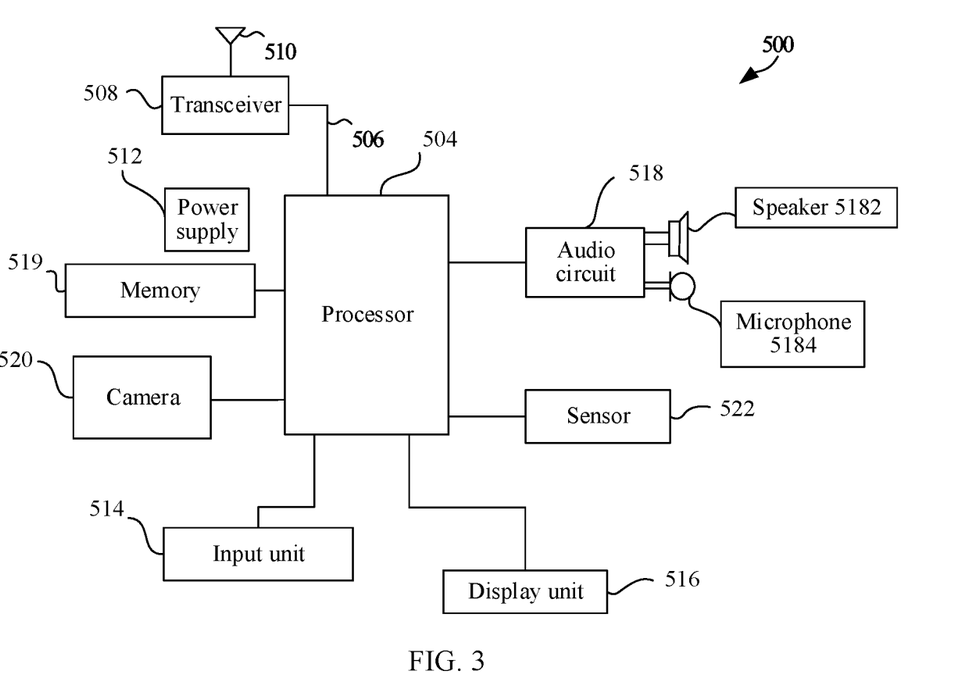
FIG. 3 is a schematic structural diagram of a transmit-end device according to this application.

FIG. 3 shows a terminal 500 according to an embodiment of this application, including at least a processor 504 and a transceiver 508.

The processor 504 is configured to generate codebook indication information of K transport layers, where K is an integer greater than or equal to 1; and for each of at least one of the K transport layers, the codebook indication information includes narrowband superposition coefficients of N sub-bands of the layer, where a quantity of the narrowband superposition coefficients of the N sub-bands is less than R(L−1)*N, N is an integer greater than or equal to 2, R is a quantity of polarization directions and R is an integer greater than or equal to 1, and L is a quantity of pieces of beam information used by the K transport layers and L is an integer greater than or equal to 2.

The transceiver 508 is configured to send the codebook indication information of the K transport layers generated by the processor 504.

During specific implementation, for any of at least one of the K transport layers, a matrix C includes the narrowband superposition coefficients of the N sub-bands of the layer, where a quantity of elements in the matrix C is RL*N; and before generating the codebook indication information of the K transport layers, the processor 504 is further configured to convert the matrix C, to obtain at least two submatrices; or normalize the matrix C, and convert the normalized matrix to obtain at least two submatrices, where the codebook indication information includes elements in the at least two submatrices.

During specific implementation, an algorithm used when performing the conversion step includes at least one of the following: an SVD algorithm, a QR decomposition algorithm, and the like.

During specific implementation, for any of at least one of the K transport layers, a matrix C includes the narrowband superposition coefficients of the N sub-bands of the layer, where a quantity of elements in the matrix C is RL*N; and before generating the codebook indication information of the K transport layers, the processor 504 is further configured to select T columns of elements from the matrix C, where T is less than a column quantity of the matrix C, and the codebook indication information includes the T columns of normalized elements; or select T columns of elements from the matrix C, and normalize the T columns of elements, where T is less than a column quantity of the matrix C, and the codebook indication information includes the T columns of normalized elements.

During specific implementation, the codebook indication information further includes location information of the T columns of elements in the matrix C.

The transceiver 508 may be configured to perform actions of transmitting or sending by the terminal to the network device, which are described in the foregoing method embodiments, and the processor 504 may be configured to perform actions implemented internally by the terminal, which are described in the foregoing method embodiments. For details, refer to the descriptions in the foregoing method embodiments. Details are not described herein again.

The terminal may also include a memory 519, which stores a computer-executable instruction. The processor 504 and the memory 519 may be integrated as a processing device. The processor 504 is configured to perform program code stored in the memory 519, to implement the foregoing function. During specific implementation, the memory 519 may alternatively be integrated in the processor 504.

The terminal may also include a power supply 512, configured to supply power to various components and circuits in the terminal. The terminal may include an antenna 510, configured to send uplink data or uplink control signaling that is output by the transceiver 508 through radio signals.

In addition, to make a function of the terminal more perfect, the terminal may also include one or more of an input unit 514, a display unit 516, an audio circuit 518, a camera 520, and a sensor 522. The audio circuit may further include a speaker 5182, a microphone 5184 and the like.

Figure 4:
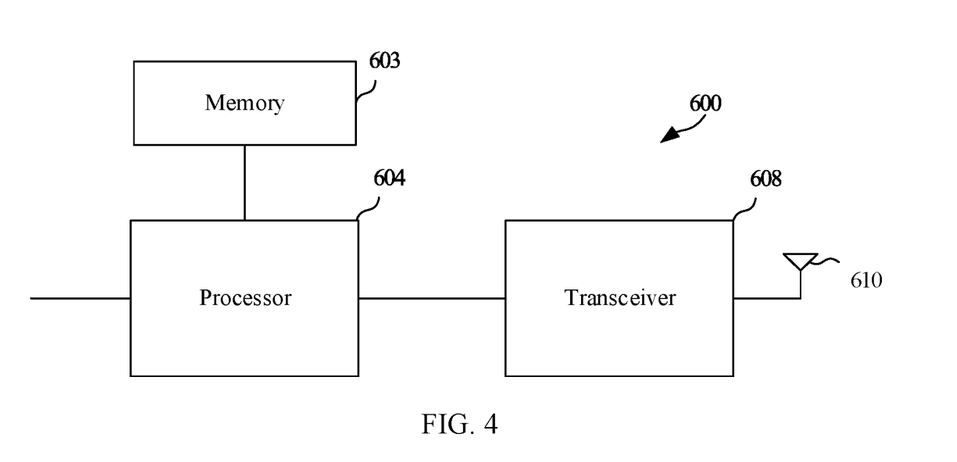
FIG. 4 is a schematic structural diagram of a receive-end device according to this application.

FIG. 4 shows a network device 600 according to an embodiment of this application, including at least a processor 604 and a transceiver 608.

The transceiver 608 is configured to receive codebook indication information of K transport layers, where K is an integer greater than or equal to 1; and for each of at least one of the K transport layers, the codebook indication information includes narrowband superposition coefficients of N sub-bands of the layer, where a quantity of the narrowband superposition coefficients of the N sub-bands is less than $R(L-1)*N$, N is an integer greater than or equal to 2, R is a quantity of polarization directions and R is an integer greater than or equal to 1, and L is a quantity of pieces of beam information used by the K transport layers and L is an integer greater than or equal to 2.

The processor 604 is configured to determine a precoding vector of each of the K transport layers based on the beam information related to the K transport layers.

During specific implementation, the network device may also include a memory 603, configured to store the codebook indication information received by the transceiver 608 or store the precoding vector obtained through processing of the processor 604.

The processor 604 and the memory 603 may be combined as a processing device, and the processor 604 is configured to perform program code stored in the memory 603 to implement the foregoing function. During specific implementation, the memory 603 may alternatively be integrated in the processor 604.

During specific implementation, the at least one transport layer includes a first transport layer, and a matrix C includes narrowband superposition coefficients of N sub-bands of the first transport layer, where a quantity of elements in the matrix C is $RL*N$; and the codebook indication information includes elements in at least two submatrices obtained through conversion of the matrix C; and the processor 604 is specifically configured to restore the matrix C based on the elements in the at least two submatrices and an algorithm used when performing the conversion step, and determine a precoding vector of the first transport layer based on the restored matrix C.

During specific implementation, the at least one transport layer includes a first transport layer, and a matrix C includes narrowband superposition coefficients of N sub-bands of the first transport layer, where a quantity of elements in the matrix C is $RL*N$; and the codebook indication information includes T columns of elements in the matrix C, where T is less than a column quantity of the matrix C; and the processor 604 is specifically configured to restore the matrix C based on the T columns of elements and location information of the T columns of elements in the matrix C, and determine a precoding vector of the first transport layer based on the restored matrix C.

During specific implementation, the codebook indication information further includes location information of the T columns of elements in the matrix C.

The network device may further include an antenna 610, configured to send downlink data or downlink control signaling that is output by the transceiver 608 through radio signals.

It should be noted that the processor 504 of the terminal and the processor 604 of a network device may be a central processing unit (CPU), a network processor (NP), or a combination of a CPU and an NP. The processor may further include a hardware chip. The hardware chip may be an application-specific integrated circuit (application-specific integrated circuit, ASIC), a programmable logic device (PLD), or a combination thereof. The PLD may be a complex programmable logic device (CPLD), a field-programmable gate array (FPGA), a generic array logic (GAL), or any combination thereof.

The memory 12 of the terminal and the memory 22 of the network device may include a volatile memory, for example, a random access memory (RAM), and may also include a nonvolatile memory, for example, a flash memory, a hard disk drive (HDD), or a solid-state drive. The memory may further include a combination of the foregoing types of memories.

The network device in the apparatus embodiments of this application may correspond to the network device in the method embodiments of this application, and the terminal may correspond to the terminal in the method embodiments of this application. Moreover, the foregoing and other operations and/or functions of each module in the network device and the terminal are respectively for implementing corresponding procedures of the method embodiments. For brevity, descriptions of the method embodiments of this application may be applicable to the apparatus embodiments. Details are not described herein again.

For the beneficial effects of the apparatus embodiments of this application, refer to the beneficial effects in the foregoing corresponding method embodiments. Details are not described herein again. In addition, for descriptions of related content of the apparatus embodiments of this application, refer to the foregoing corresponding method embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communications connections may be implemented by using some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the current system, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
generating, by a transmit-end device, codebook indication information of K transport layers, wherein K is an integer greater than or equal to 1, wherein the codebook indication information comprises narrowband superposition coefficients of N sub-bands for each of the K transport layers, a quantity of the narrowband superposition coefficients of the N sub-bands is less than $R(L-1)*N$, N is an integer greater than or equal to 2, R is a quantity of polarization directions, R is an integer greater than or equal to 1, L is a quantity of pieces of beam information of the K transport layers, and L is an integer greater than or equal to 2; and
sending, by the transmit-end device, the codebook indication information.

2. The method according to claim 1, wherein:
for a transport layer of the K transport layers, a matrix C consists of respective narrowband superposition coefficients of respective N sub-bands of the transport layer, wherein a quantity of elements in the matrix C is $RL*N$; and
before generating, by the transmit-end device, the codebook indication information of the K transport layers, the method further comprises:
converting, by the transmit-end device, the matrix C to obtain at least two submatrices, wherein the codebook indication information comprises elements in the at least two submatrices; or
normalizing, by the transmit-end device, the matrix C to obtain a normalized matrix, and converting the normalized matrix to obtain at least two submatrices, wherein the codebook indication information comprises elements in the at least two submatrices.

3. The method according to claim 2, wherein an algorithm used for converting the matrix C or the normalized matrix to obtain the at least two submatrices comprises: a singular value decomposition (SVD) algorithm or an orthogonal triangle (QR) decomposition algorithm.

4. The method according to claim 1, wherein:
for a transport layer of the K transport layers, a matrix C consists of respective narrowband superposition coefficients of respective N sub-bands of the transport layer, wherein a quantity of elements in the matrix C is $N*RL$; and
before generating, by the transmit-end device, the codebook indication information of the K transport layers, the method further comprises:
selecting, by the transmit-end device, T columns of elements from the matrix C, wherein T is less than a column quantity of the matrix C, and the codebook indication information comprises the T columns of elements; or
selecting, by the transmit-end device, T columns of elements from the matrix C, and normalizing the T columns of elements to obtain T columns of normalized elements, wherein T is less than a column quantity of the matrix C, and the codebook indication information comprises the T columns of normalized elements.

5. The method according to claim 4, wherein the codebook indication information further comprises location information of the T columns of elements in the matrix C.

6. A method, comprising:
receiving, by a receive-end device, codebook indication information of K transport layers, wherein K is an integer greater than or equal to 1, wherein the codebook indication information comprises narrowband superposition coefficients of N sub-bands for each of the K transport layers, a quantity of the narrowband superposition coefficients of the N sub-bands is less than R(L−1)*N, N is an integer greater than or equal to 2, R is a quantity of polarization directions, R is an integer greater than or equal to 1, L is a quantity of pieces of beam information of the K transport layers, and L is an integer greater than or equal to 2; and determining, by the receive-end device, a precoding vector of each of the K transport layers according to the codebook indication information.

7. The method according to claim 6, wherein:

for a transport layer of the K transport layers, a matrix C consists of respective narrowband superposition coefficients of respective N sub-bands of the transport layer, wherein a quantity of elements in the matrix C is RL*N;

the codebook indication information comprises elements in at least two submatrices obtained through conversion of the matrix C; and determining, by the receive-end device, the precoding vector of each of the K transport layers according to the codebook indication information comprises:

restoring, by the receive-end device, the matrix C according to the elements in the at least two submatrices and an algorithm used during conversion of the matrix C to obtain a restored matrix C; and determining a precoding vector of the transport layer according to the restored matrix C.

8. The method according to claim 6, wherein:

for a transport layer of the K transport layers, a matrix C consists of respective narrowband superposition coefficients of respective N sub-bands of the transport layer, wherein a quantity of elements in the matrix C is N*RL;

the codebook indication information comprises T columns of elements in the matrix C, wherein T is less than a column quantity of the matrix C; and determining, by the receive-end device, the precoding vector of each of the K transport layers according to the codebook indication information comprises:

restoring, by the receive-end device, the matrix C according to the T columns of elements and location information of the T columns of elements in the matrix C to obtain a restored matrix C; and determining a precoding vector of the transport layer according to the restored matrix C.

9. The method according to claim 8, wherein the codebook indication information further comprises the location information of the T columns of elements in the matrix C.

10. A device, comprising:

a processor, configured to generate codebook indication information of K transport layers, wherein K is an integer greater than or equal to 1, wherein the codebook indication information comprises narrowband superposition coefficients of N sub-bands for each of the K transport layers, wherein a quantity of the narrowband superposition coefficients of the N sub-bands is less than R(L−1)*N, N is an integer greater than or equal to 2, R is a quantity of polarization directions, R is an integer greater than or equal to 1, L is a quantity of pieces of beam information of the K transport layers, and L is an integer greater than or equal to 2; and a transceiver, configured to send the codebook indication information.

11. The device according to claim 10, wherein:

for a transport layer of the K transport layers, a matrix C consists of respective narrowband superposition coefficients of respective N sub-bands of the transport layer, wherein a quantity of elements in the matrix C is RL*N; and before generating the codebook indication information of the K transport layers, the processor is further configured to:

convert the matrix C to obtain at least two submatrices, wherein the codebook indication information comprises elements in the at least two submatrices; or normalize the matrix C to obtain a normalized matrix, and convert the normalized matrix to obtain at least two submatrices, wherein the codebook indication information comprises elements in the at least two submatrices.

12. The device according to claim 11, wherein an algorithm used for converting the matrix C or the normalized matrix to obtain the at least two submatrices comprises at least one of the following: a singular value decomposition (SVD) algorithm or an orthogonal triangle (QR) decomposition algorithm.

13. The device according to claim 10, wherein:

for a transport layer of the K transport layers, a matrix C consists of the narrowband superposition coefficients of the N sub-bands of the layer, wherein a quantity of elements in the matrix C is RL*N; and before generating the codebook indication information of the K transport layers, the processor is further configured to:

select T columns of elements from the matrix C, wherein T is less than a column quantity of the matrix C, and the codebook indication information comprises the T columns of elements; or select T columns of elements from the matrix C, and normalize the T columns of elements to obtain T columns of normalized elements, wherein T is less than a column quantity of the matrix C, and the codebook indication information comprises the T columns of normalized elements.

14. The device according to claim 13, wherein the codebook indication information further comprises location information of the T columns of elements in the matrix C.

* * * * *